(12) United States Patent
Antonov et al.

(10) Patent No.: US 7,729,530 B2
(45) Date of Patent: Jun. 1, 2010

(54) METHOD AND APPARATUS FOR 3-D DATA INPUT TO A PERSONAL COMPUTER WITH A MULTIMEDIA ORIENTED OPERATING SYSTEM

(76) Inventors: Sergey Antonov, 1214-40 High Park Ave., Toronto, ON (CA) M6P 2S1;
Alexei I Antonov, 1604-40 High Park Ave., Toronto, ON (CA) M6P 2S1

( * ) Notice: Subject to any disclaimer, the term of this patent is extended or adjusted under 35 U.S.C. 154(b) by 759 days.

(21) Appl. No.: 11/681,760

(22) Filed: Mar. 3, 2007

(65) Prior Publication Data

US 2007/0126735 A1 Jun. 7, 2007

(51) Int. Cl.
*G06K 9/00* (2006.01)
*G06K 9/68* (2006.01)
*G06T 15/00* (2006.01)

(52) U.S. Cl. .................. 382/154; 382/218; 345/419

(58) Field of Classification Search ............. 382/154, 382/218; 345/419
See application file for complete search history.

(56) References Cited

U.S. PATENT DOCUMENTS 7,126,630 B1 * 10/2006 Lee et al. .................. 348/218.1
7,408,140 B2 * 8/2008 Gazeley .................... 250/208.1

* cited by examiner

*Primary Examiner*—Daniel G Mariam

(57) ABSTRACT

In this exciting time of increasingly powerful computer tools only few imaginable things are left to be invented. Recently issued PC multimedia operating system Vista supports speech and hand writing recognition, visual and data streaming and networking, as well as traditional computer powers. Present invention is meant to fulfill the only gap left in computer abilities: which is comprehensive general purpose three-dimensional vision to enable computers to see the world they have changed so much. The main feature of this invention is an advanced and powerful image preprocessing method and apparatus supporting thereof.

16 Claims, 1 Drawing Sheet

METHOD AND APPARATUS FOR 3-D DATA INPUT TO A PERSONAL COMPUTER WITH A MULTIMEDIA ORIENTED OPERATING SYSTEM

DESCRIPTION

In this exciting time of increasingly powerful computer tools only few imaginable things are left to be invented. Recently issued a PC multimedia operating system Vista supports speech and hand writing recognition, visual and data streaming, networking, as well as traditional computer powers. Present invention is meant to fill the only gap left in computer abilities: comprehensive general purpose three-dimensional vision to enable computers to see the world they have changed so much. The main feature of this invention is an advanced and powerful image preprocessing method and apparatus supporting thereof.

Existing vision systems in general, and three-dimensional (3-D) in particular, take a lot of resources for image processing. The whole procedure is rather time consuming and can not give precise results without numerous calibrations and adjustments.

A wide variety of computer vision systems are available on the market. However, an affordable real time general purpose computer vision system suitable for general PC market is lacking. The purpose of our invention is to provide such a system. Main features of the proposed method and apparatus are firstly an effective way to determine brightness step marks of objects, and secondly to provide a distance to these marks where possible. To achieve that, the system including two synchronized and specifically mounted cameras, as well as digital image processor performing above mentioned functions are proposed. These functions comprise a novel method of finding brightness step marks in the images of objects suitable for distance measurement. The apparatus combining two cameras and an image processor is specifically designed to support the implementation of said functions. The functions are specifically optimized for efficient hardware or software on-the-fly implementation.

DETAILED DESCRIPTION OF THE INVENTION

Figure 1:
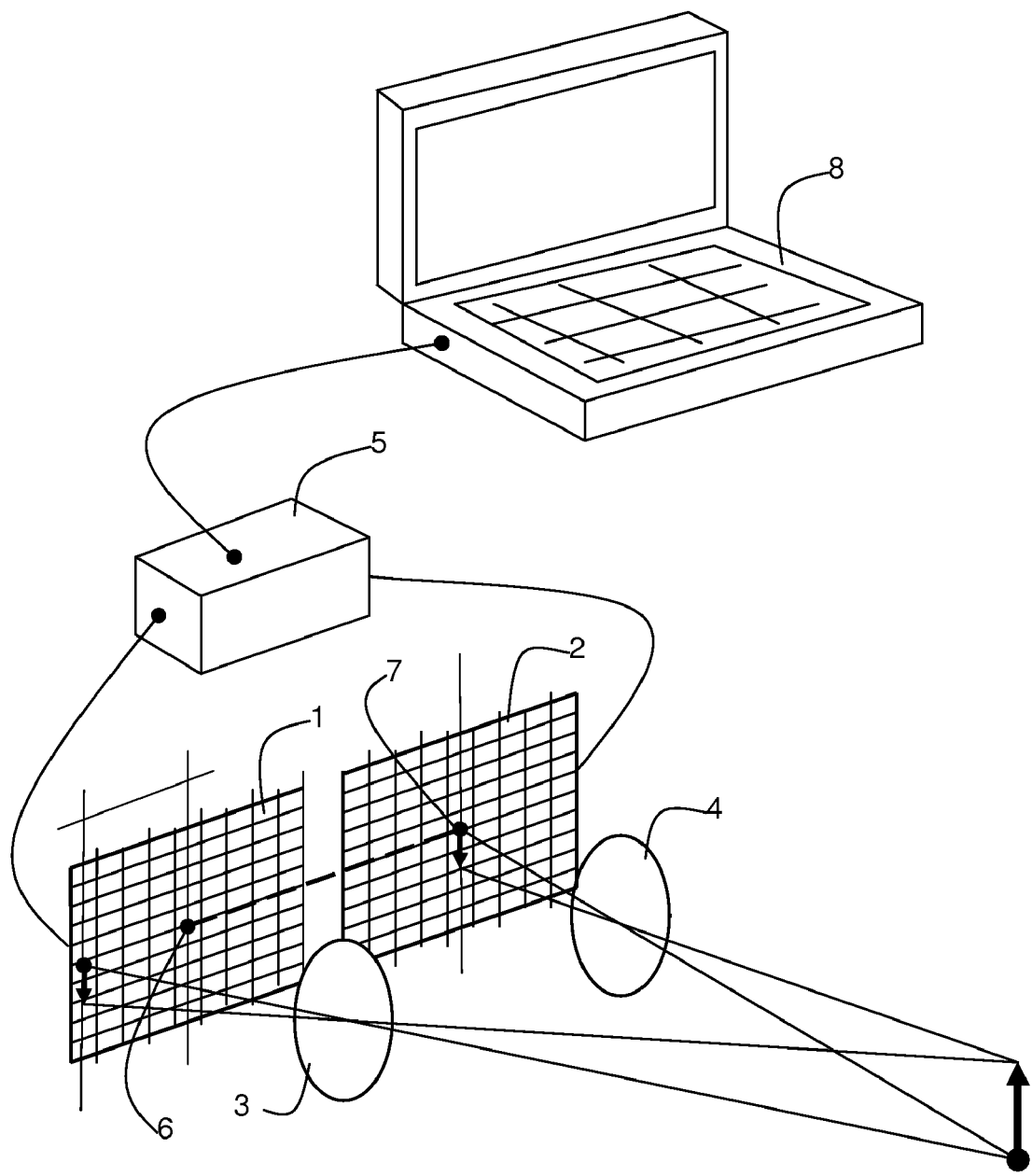
FIG. 1 schematically shows a three dimensional computer vision system for a Vista PC: a personal computer 8 connected to an image processing unit 5; the image processing unit connected to image sensors 1, 2; the image sensors' matrixes aligned along a line between their optical centers 6, 7; two lenses 3, 4 on the optical axis positions of the image sensors.

It is possible to see something when objects have visible marks associated with them. Those are naturally occurring on the edges of objects, uneven surfaces and when objects are colored. The first case could be illustrated by a peace of paper placed at some distance against a wall. Even both the sheet of paper and the wall could be of the same color, different distances from a light source would produce different brightness of said sheet and said wall. As an image of those would appear in some image sensor, the field of pixels or points of a similar brightness representing the wall would change and turn into the field of different brightness pixels representing the paper. That change of brightness or a step of brightness will appear at the edge of said paper.

Similar effects would be observed should we paint part of the paper black or should we fold the paper producing change of lighting conditions, such as a shadow.

Those above mentioned naturally occurring visible marks are somewhat similarly appeared in an image. Although all of them are represented by step of brightness, they are not always represented by a sharp one-pixel change of said color at the edge of an object or at some other visible mark. Due to the nature of the mark itself or of the image system, the step of brightness could be modified or stretched. Most common cause of that could be 'out of focus' position of the mark.

It is a goal of our invention to make a method and apparatus which would allow taking a 3-D image of whatever object might be inside the field of view. Like human eyes, two image sensors positioned next to each other and having about the same view area, naturally see objects almost identically. Still as those objects are seen by the sensors at slightly different angles, they may appear different in images and most essentially, they appear shifted with respect to each other when two images are compared. It is essential that the value of this shift relates to the distance to the object from the sensors. As mentioned above, objects appear in the images as a multitude of brightness step marks.

It is essential that distance could be found for those marks independently and simultaneously for the whole image as far as it is common for both sensors. As opposed to conventional rangefinders, which typically require object recognition and/or coordinates before measurement is made, in present invention distance is found for many marks without consideration to which object those belong. Moreover, having third dimension assigned to those brightness step marks, this invention assists in further object recognition, as that 3-D information helps to determine shape and relative position of the objects. It is beneficial for this invention that, for distance measurement to a brightness step mark, the only information that is required is a few consequent brightness values taken in the direction from one image sensor to the other one. The shift of apparent image of the object manifested by the marks is observed in that direction only. Therefore, it is sufficient to find the mark in both images along the same line and measure the relative shift. It is trivial geometrical problem to calculate the distance to the mark of the object knowing the distance between image sensors as well as the value of the shift in image pixels, the size of the pixel and effective focus distance for the sensors. Distance to the object mark is equal the distance between the sensors divided by the shift and multiplied by the focus.

As it was mentioned before the mark may appear over a number of image pixels. Various methods to find the mark could be employed. We would recommend finding a sequence of pixels where their brightness is increasing or decreasing throughout the sequence. We would consider value as increasing if it is higher then the previous one by an amount larger than typical noise, or natural brightness variation. Therefore, first and last pixels in the sequence will always be minimum or maximum brightness of the sequence. As well, the first or last pixels of the sequence will always have neighboring value equal to it, or it will have either both neighbors higher or both lower. For a pixel within the sequence it will always be that one neighbor is brighter and another as dimmer.

This suggested way of determining marks will work in most cases but those with very light brightness variations and bad lighting conditions.

Brightness step, as defined above, will have a step value, meaning brightness difference from one end to another. It will have blur or width value, which means the number of pixels in the sequence, and it will have position coordinates: one is a number of the line where the sequence belongs to, and another is a position within the line as a point in the middle between the first and the last pixels of the sequence measured in half pixels. For the best performance and ease of use, it is essential to have pixels of image sensors aligned along the line from one sensor to the other. In this case a mark of the object found in some line in one image should be found in the same line of the other one being shifted by a number of half pixel steps indicative of the distance to said mark of said object. It is expected that some marks would not appear similar enough in both images to be resolved to the point of the measuring the distance. Still it is expected that for majority of marks that will be possible. Both the step of the mark and the width of the mark could be used for identification. It is possible to use only the step of the mark as well as it is possible to use other features, such as the pattern of brightness change within the mark, or a combination of three color sequences for a three color image sensors. It is essential though, that for all imaginable cases the positions of two corresponding marks are to be found and the distance to the mark shall be calculated from the difference in their positions. It is conceivable that information about the marks, as defined above and not resolved to the point of finding distance, could be useful for object recognition, because it provides detected feature of objects which are sufficiently different as seen by at a slight angle difference.

The proposed method and apparatus allow to significantly reduce volume of meaningful information describing 3-D images and major distances to objects by comparing and processing data from corresponding rows of light sensing elements of specifically positioned and synchronized cameras. Moreover, row by row pixel data comparing and processing, without complicated mathematical calculations and transformations, result in an instant image analysis not slowing down the information transmission speed. As long as the rows of light sensing elements of the used cameras are parallel to a line drawn through optical centers of their image sensors, each row of the one image sensor corresponds to a row of the other one lying on a common line. Consequently, a point of an observed object turns up in both corresponding rows of the light sensing elements of the image sensors. Basically, a shift between the same brightness step marks of the observed object, appearing in the corresponding rows of light sensing elements of the cameras, gives a scaled distance from the cameras to this mark of the object. Then, knowing the distance to the object, it is possible to get its dimensions. Then, to identify the object, all received points or marks can be turned into contours. Then, contours and dimensions are transmitted to a PC for further image analysis. All this forms a new vision system for acquiring and transmitting 3-D images to a PC. This apparatus may be connected to a PC via a standard USB port.

Simple design and low cost components of the proposed 3-D vision system are favorable for its mass production, similarly to game and web-cameras. Though, unlike latter ones, our vision system will allow personal computers to receive real time 3-D information about objects in view, including dimensions and distances. As long as said information will be delivered into a computer at camera shooting frequency, both distance and speed measurements of fast moving objects become feasible. That, in turn, comes to high speed vision systems for robots. It can help make robots react instantly to a changing environment with ability to analyze sizes, shapes of objects and distances to them without visible delays and additional sensors and rangefinders.

For all tasks, where there is a need to find distances to objects, even fast moving ones, the proposed system can be applied. For different weather and lighting conditions appropriate types of image sensors and lenses may be employed.

All security and monitoring systems can gain from use of this type of vision systems, because distance information allows for perfect zoom and focus.

The proposed apparatus is slightly bigger in size than a typical web-camera due to two incorporated cameras. The cameras can be easily combined in one enclosure with an image processor, what leaves outside only a cable with a USB connector for a PC communication.

Computer game developers working with 3-D information including points, contours, distances and dimensions can make use of it and create numerous interactive applications. Some image processing algorithms for the proposed vision system can be also imbedded in multimedia operating systems such as Vista. Thus, the proposed affordable 3-D vision system can move Computer World to real human vision from flat obsolete 2-D one.

This system, additionally utilizing high-resolution cameras and corresponding optics, can be added up to existing 3-D mechanical design systems, such as Solid Works and Auto CAD. It may allow for fast input of 3D object images into the software without manual measurements.

The high speed of image processing, utilized in our invention, makes it valuable for applications dealing with fast moving objects, where instant calculations of speed, distance and dimensions are required, such as object tracing, camera focus & zoom adjusting, etc.

PREFERRED EMBODIMENT

The preferred embodiment of this invention is a low cost general purpose PC-based 3-D image peripheral. That would include two ¼" VGA image sensors with 6 um pixel size, mounted on a single PCB, each having a lens, with about 6 mm focus length, and about 60 degrees angle of view, with a distance between optical centers of the sensors of about 40 mm. This configuration would provide practically sufficient 3-D resolution for a typical 'in front of a computer' environment such as a room or an office. The same PCB could have an image controller, simultaneously receiving data from the sensors, performing simultaneous range finding as described above, and shipping resulting 3-D image data via USB port.

The preferred solution is a digital image processor implemented as a hardware solution, such as FPGA or ASIC. So the image processing is done during image transmission from image sensors at the speed of image transmission, therefore, leaving more time for high level view analyses by PC.

It is preferred that said processed image is delivered to PC via USB port for cost reasons.

It is conceivable that said controller could be a PCI add-on card within a computer, or even an entire image processing being implemented on a PC itself. Similarly it is conceivable that the controller could carry on further image processing tasks beyond 3-D image preprocessing described in this invention. This preferred embodiment system, as limited as it is by lack of zoom or focus correction or high definition mega-pixel sensors, still could be used in variety of applications. As well as human eyes are empowered by stereoscopic binoculars, microscopes and glasses, the proposed apparatus could be used in various applications being improved by internal or external changes. Internal changes would be high resolution image sensors and complex lenses with iris, focus and zoom control. External changes would be off-the-shelf devices such as microscopes or binoculars as well as custom built optical systems.

That will make a common and affordable 3-D PC vision system potentially useful in specific demanding applications.

It is known to those skilled in the art what optical parameters are necessary for a particular system performance.

The proposed apparatus can also be used in such applications as 3-D web-cameras, industrial and transport control, instant rangefinders, optical following of objects, etc.

We claim:

1. An apparatus comprising:
   at least two image sensors, each having an optical center and light sensing elements arranged in rows and columns, said image sensors positioned in such a way that the rows of the sensing elements are parallel to a line connecting the optical centers;
   means to compare and process images received from said image sensors.

2. The apparatus from claim 1 wherein the image sensors are synchronized to take images simultaneously.

3. The apparatus from claim 1 wherein the image sensors lie on the same plane.

4. The apparatus from claim 1 having lenses, one per each image sensor.

5. The apparatus from claim 4 wherein optical axes of the lenses are parallel.

6. The apparatus from claim 1 wherein the image sensors are identical.

7. The apparatus from claim 1 wherein the image sensors are digital cameras.

8. The apparatus from claim 1 having a computer interface.

9. The apparatus from claim 1 wherein images from the image sensors are identical when taken at infinity.

10. The apparatus from claim 1 having means to compare and process data from corresponding rows of the light sensing elements of said image sensors.

11. The apparatus from claim 10 having means to calculate distance from the apparatus to an object in its field of view as a function of an apparent shift of the object within the images of said sensors by comparing and processing data of the sensing elements from corresponding rows of these image sensors.

12. The apparatus from claim 1 having means to identify brightness step marks in images of the image sensors, calculate shift between corresponding marks in images of the image sensors, and transmit this data to a computer.

13. The apparatus from claim 12 having means to combine the brightness step marks into contours.

14. The apparatus from claim 1 having means to calculate 3-D coordinates of objects.

15. A method for instant calculation of distances to objects by processing images received from an apparatus having two image sensors, each having an optical center and mounted in such a way that rows of their light sensing elements are parallel to a line connecting the optical centers, comprising the steps of:
   obtaining images by the two sensors with overlapping view areas;
   finding brightness step marks in the images;
   determining the same marks in the corresponding rows of the light sensing elements of the image sensors;
   calculating a shift between the same marks in the corresponding rows of the light sensing elements of the image sensors;
   calculating distance to the object's mark equal to the distance between the optical centers of the image sensors divided by the shift and multiplied by the focus.

16. A method for instant calculation of distances to objects by processing images received from an apparatus having two image sensors, each having an optical center and mounted in such a way that rows of their light sensing elements are parallel to a line connecting the optical centers, comprising the steps of:
   obtaining images by the two sensors with overlapping view areas;
   calculating a brightness step mark in a row of light sensing elements of one of the image sensors;
   finding an identical brightness step mark in a corresponding row of the light sensing elements of the other image sensor;
   calculating a positional difference between said brightness step marks in the corresponding rows of the light sensing elements of those image sensors;
   assigning the distance value corresponding to said positional difference.

* * * * *